(12) United States Patent
Bouzmane

(10) Patent No.: US 9,593,677 B1
(45) Date of Patent: *Mar. 14, 2017

(54) ELECTRIC HYDRAULIC MOTOR SYSTEM FOR VEHICLES

(71) Applicant: Mohammed Bouzmane, Columbus, OH (US)

(72) Inventor: Mohammed Bouzmane, Columbus, OH (US)

(*) Notice: Subject to any disclaimer, the term of this patent is extended or adjusted under 35 U.S.C. 154(b) by 405 days.

This patent is subject to a terminal disclaimer.

(21) Appl. No.: 14/284,115

(22) Filed: May 21, 2014

(51) Int. Cl.
*F04B 35/00* (2006.01)
*B60K 6/12* (2006.01)
*B60K 6/48* (2007.10)

(52) U.S. Cl.
CPC .............. *F04B 35/002* (2013.01); *B60K 6/12* (2013.01); *B60K 6/48* (2013.01); *Y02T 10/6208* (2013.01); *Y02T 10/6221* (2013.01); *Y10S 903/903* (2013.01)

(58) Field of Classification Search
CPC ......... B60K 6/12; B60K 6/48; Y02T 10/6208; Y02T 10/6221; Y10S 903/903
See application file for complete search history.

(56) References Cited

U.S. PATENT DOCUMENTS

| 4,593,779 | A | 6/1986 | Krohling |
| D305,746 | S | 1/1990 | Allendorph |
| 5,415,603 | A | 5/1995 | Tuzuki et al. |
| 6,330,498 | B2 | 12/2001 | Tamagawa et al. |
| 6,644,427 | B2 | 11/2003 | Schulte |
| 7,237,634 | B2 | 7/2007 | Severinsky et al. |
| 8,327,637 | B2* | 12/2012 | Loeffler ............ B60K 6/12 60/414 |
| 8,601,806 | B1 | 12/2013 | Bouzmane |

* cited by examiner

*Primary Examiner* — Patrick Hamo

(57) ABSTRACT

An electric hydraulic motor system for vehicles features an electric motor and an electric generator operatively connected to a battery of a vehicle and hydrogen fuel cell. The system features a fuel engine hydraulic pump operatively connected to a standard fuel engine of the vehicle. The system features a hydraulic reservoir operatively connected to the fuel engine hydraulic pump. The system features a first hydraulic pump operatively connected to each the electric motor and the hydraulic reservoir. The system features a first hydraulic motor operatively connected to each the hydraulic reservoir, and wheels of the vehicle. The system features a second hydraulic motor operatively connected to each the electric generator and the hydraulic reservoir. The system features a second hydraulic pump operatively connected to each the wheels of the vehicle and the hydraulic reservoir.

13 Claims, 3 Drawing Sheets

ELECTRIC HYDRAULIC MOTOR SYSTEM FOR VEHICLES

FIELD OF THE INVENTION

The present invention relates to electric hydraulic motor systems for vehicles for reduced fuel consumption.

BACKGROUND OF THE INVENTION

Currently in society, there is large consumption of oil due to the wide spread use of internal combustion engines. This, in turn, causes high levels of emissions and pollutants to be released into the atmosphere. The present invention provides reduced gas emissions and decreased pollution as well as operation with less noise and reduced wear on brakes. The system of the present invention may be used in large vehicles, for example semi-trucks, buses, trains, ships, or any heavy vehicle as well as vehicles of other sizes. The present invention features an electric hydraulic motor system for vehicles.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features an electric hydraulic motor system for vehicles. In some embodiments, the system comprises an electric motor and an electric generator, both the electric motor and the electric generator are operatively connected to a battery of a vehicle. In some embodiments, the system comprises a fuel engine hydraulic pump operatively connected to a standard fuel engine of the vehicle. In some embodiments, the system comprises a hydraulic reservoir operatively connected to the fuel engine hydraulic pump. In some embodiments, the system comprises a first hydraulic pump operatively connected to each the electric motor and the hydraulic reservoir. In some embodiments, the system comprises a first hydraulic motor operatively connected to each the first hydraulic pump, the hydraulic reservoir, and wheels of the vehicle. In some embodiments, the system comprises a second hydraulic motor operatively connected to each the electric generator and the hydraulic reservoir. In some embodiments, the system comprises a second hydraulic pump operatively connected to each the wheels of the vehicle and the hydraulic reservoir.

In some embodiments, in drive mode the electric motor and standard fuel engine of the vehicle together create hydraulic pressure via the first hydraulic pump and the fuel engine hydraulic pump, the first hydraulic pump and the fuel engine hydraulic pump supply the first hydraulic motor with hydraulic pressure to drive the wheels of the vehicle.

In some embodiments, in braking mode the wheels drive the second hydraulic pump. In some embodiments, the second hydraulic pump supplies hydraulic pressure to the fourth accumulator. In some embodiments, a valve releases hydraulic pressure to supply the second hydraulic motor with hydraulic pressure to drive the electric generator to charge the battery of the vehicle.

DESCRIPTION OF PREFERRED EMBODIMENTS

Figure 1:
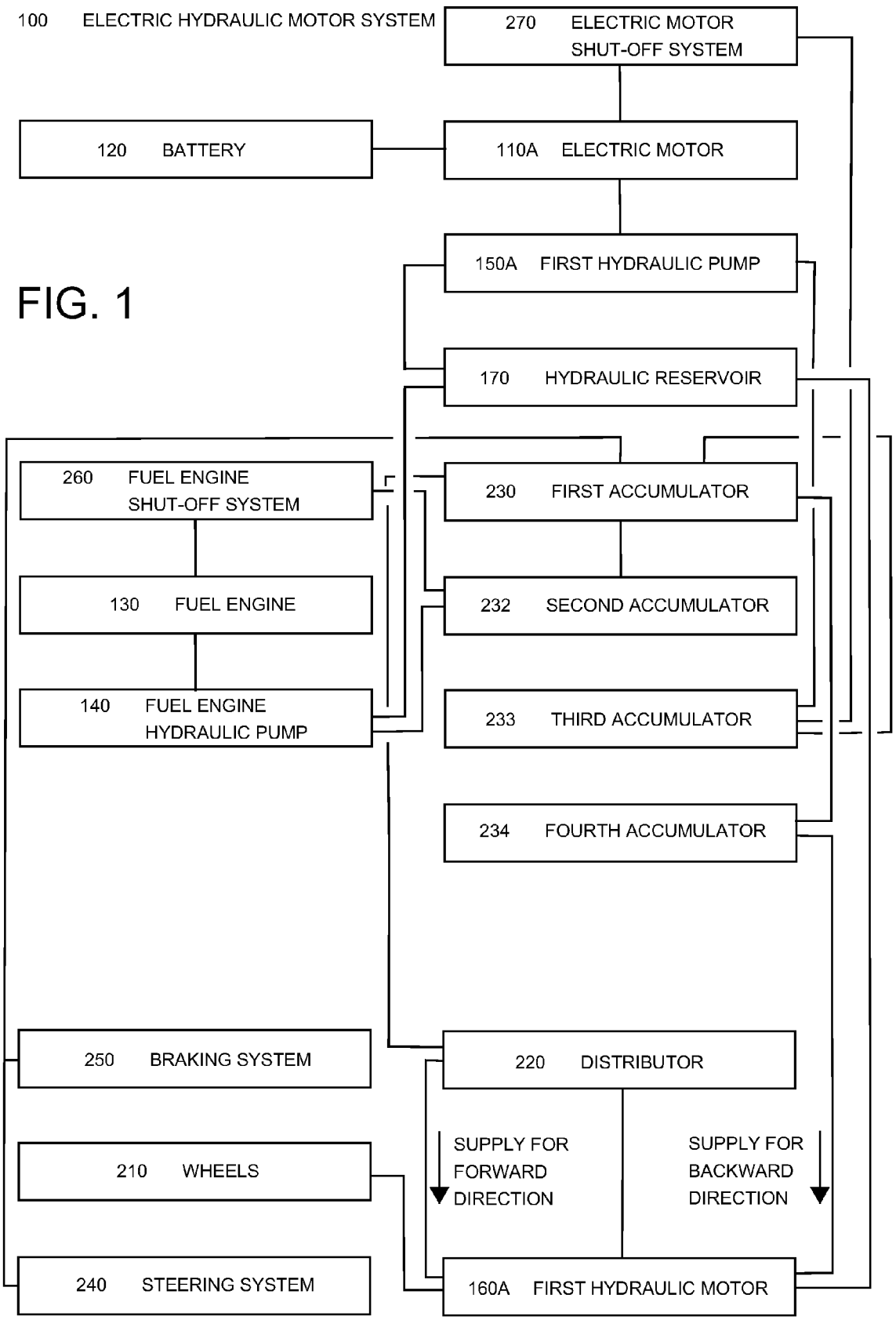
FIG. 1 shows a schematic of the system featuring a hydraulic driving system.
Figure 2:
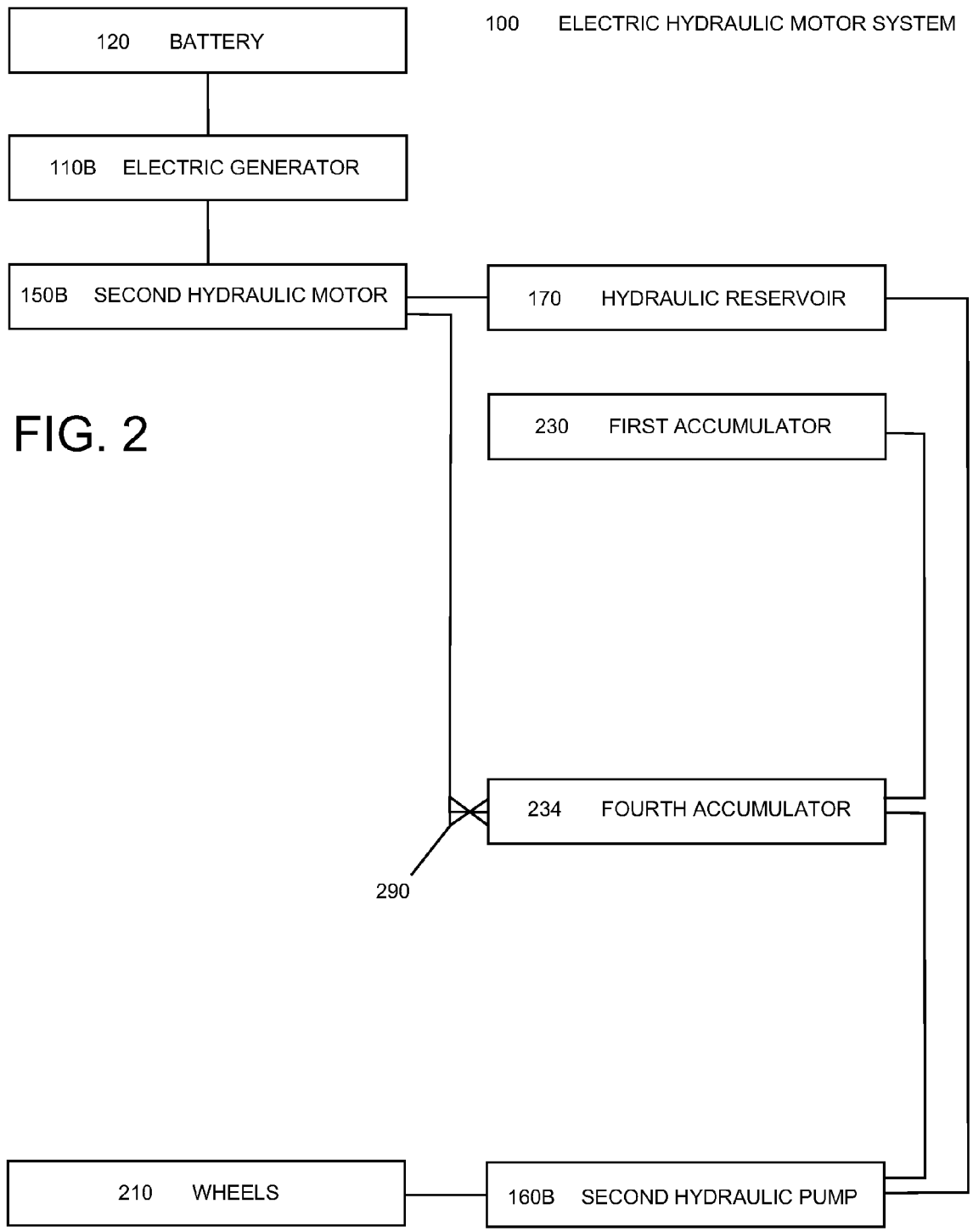
FIG. 2 shows a schematic of the system featuring a braking and electric generating system.
Figure 3:
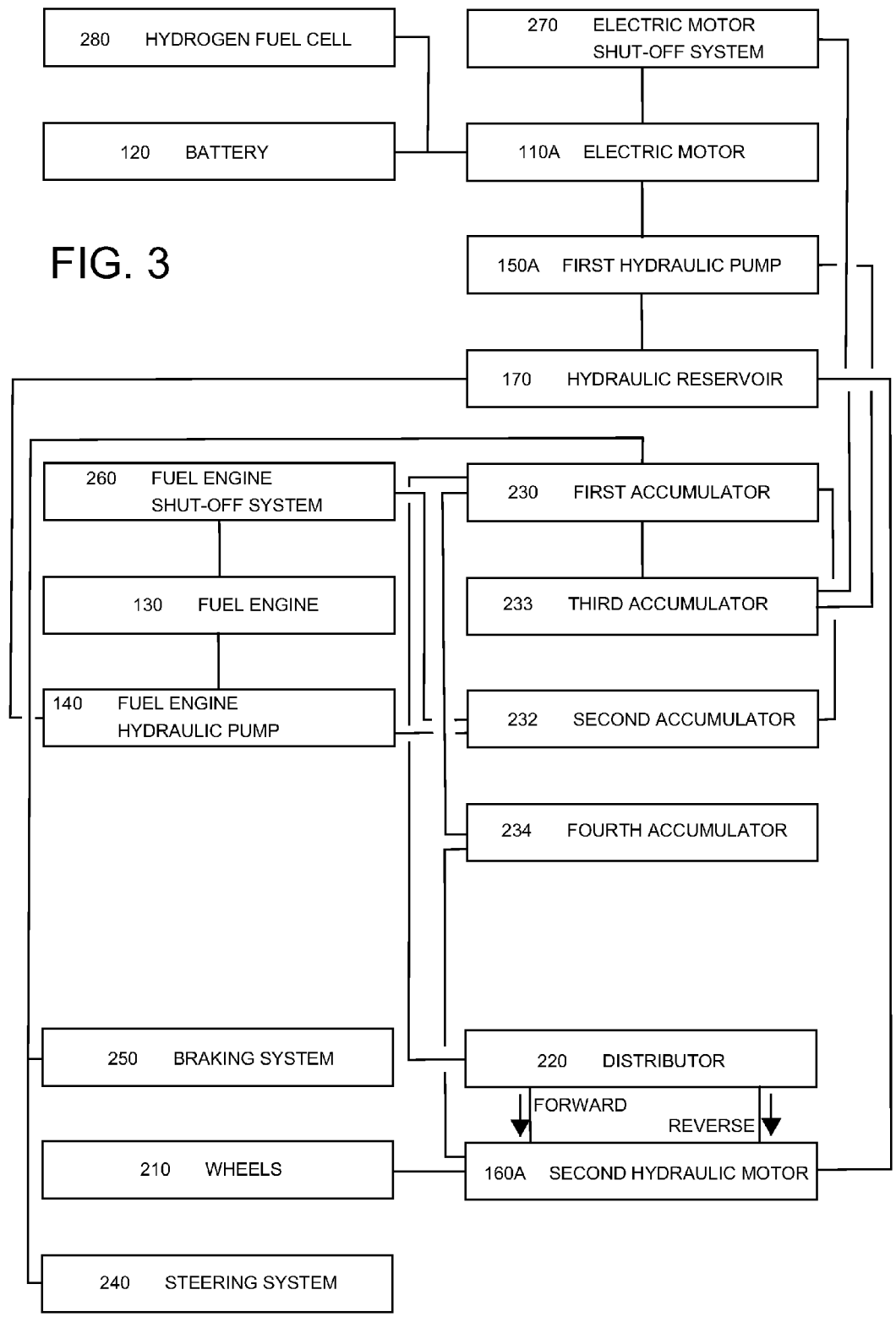
FIG. 3 shows a schematic of the system featuring an extended range vehicle driving system.

Following is a list of elements corresponding to a particular element referred to herein:
100 Electric hydraulic motor system
110a Electric motor
110b Electric generator
120 Battery
130 Fuel engine
140 Fuel engine hydraulic pump
150a First hydraulic pump
150b Second hydraulic motor
160a First hydraulic motor
160b Second hydraulic pump
170 Hydraulic reservoir
210 Wheel
220 Distributor
230 First accumulator
232 Second accumulator
233 Third accumulator
234 Fourth accumulator
240 Steering system
250 Braking system
260 Fuel engine shut-off system
270 Electric motor shut-off system
280 Hydrogen fuel cell
290 Valve Referring now to FIG. 1-3, the present invention features an electric hydraulic motor system (100) for vehicles. In some embodiments, the system (100) comprises an electric motor (110a) and an electric generator (110b), both the electric motor (110a) and the electric generator (110b) are operatively connected to a battery (120) of a vehicle.

In some embodiments, the system (100) comprises a fuel engine hydraulic pump (140) operatively connected to a standard fuel engine (130) of the vehicle. In some embodiments, the fuel engine (130) is a gasoline, a diesel, a natural gas, or a propane powered fuel engine (130).

In some embodiments, the system (100) comprises a hydraulic reservoir (170) operatively connected to the fuel engine hydraulic pump (140).

In some embodiments, the system (100) comprises a first hydraulic pump (150a) operatively connected to each the electric motor (110a) and the hydraulic reservoir (170).

In some embodiments, the system (100) comprises a first hydraulic motor (160a) operatively connected to the hydraulic reservoir (170) and wheels (210) of the vehicle.

In some embodiments, the system (100) comprises a second hydraulic motor (150b) operatively connected to each the electric generator (110b), the hydraulic reservoir (170), and the fourth accumulator (234) via a valve (290)

In some embodiments, the system (100) comprises a second hydraulic pump (160b) operatively connected to the wheels (210) of the vehicle and the hydraulic reservoir (170).

In some embodiments, in drive mode the electric motor (110a) and standard fuel engine (130) of the vehicle together create hydraulic pressure via the first hydraulic pump (150a) and the fuel engine hydraulic pump (140), the first hydraulic pump (150a) and the fuel engine hydraulic pump (140)

supply the first hydraulic motor (160a) with hydraulic pressure to drive the wheels (210) of the vehicle.

In some embodiments, in braking mode the wheels (210) drive the first hydraulic motor (160a). In some embodiments, the first hydraulic motor (160a) supplies hydraulic pressure to the fourth accumulator (234). In some embodiments, a valve (290) releases hydraulic pressure to supply the second hydraulic motor (150b) with hydraulic pressure to drive the electric generator (110b) and charge the battery (120) of the vehicle.

In some embodiments, a distributor (220) is operatively connected to the first hydraulic motor (160a) and a first accumulator (230). In some embodiments, the distributor (220) is a switching component having a first mode and a second mode. In some embodiments, the first mode is engaged to supply the first hydraulic motor (160a) with hydraulic pressure to drive the wheels (210) of the vehicle in a first direction. In some embodiments, the second mode is engaged to supply the first hydraulic motor (160a) with hydraulic pressure to drive the wheels (210) of the vehicle in a second direction.

In some embodiments, the system (100) further comprises a first accumulator (230). In some embodiments, the first accumulator (230) is operatively connected to the wheels (210) of the vehicle via the distributor (220). In some embodiments, the first accumulator (230) supplies the first hydraulic motor (160a) via the distributor (220) to drive the vehicle forward or backward.

In some embodiments, the first accumulator (230) is operatively connected to a steering system (240) of the vehicle. In some embodiments, the first accumulator (230) supplies hydraulic pressure to the steering system (240) of the vehicle to provide operating power to steer the vehicle.

In some embodiments, the first accumulator (230) is operatively connected to a braking system (250) of the vehicle. In some embodiments, the first accumulator (230) supplies hydraulic pressure to the braking system (250) of the vehicle to provide operating power to brake the vehicle.

In some embodiments, a second accumulator (232) is operatively connected to the fuel engine hydraulic pump (140) and the first accumulator (230). In some embodiments, the fuel engine hydraulic pump (140) supplies the second accumulator (232) with hydraulic pressure. In some embodiments, the second accumulator (232) supplies the first accumulator (230) with hydraulic pressure.

In some embodiments, a fuel engine shut-off system (260) is operatively connected to the second accumulator (232). In some embodiments, upon reaching a first, high pressure in the second accumulator (232), the fuel engine (130) is deactivated. In some embodiments, upon reaching a second, low pressure in the second accumulator (232), the fuel engine (130) is activated.

In some embodiments, a third accumulator (233) is operatively connected to the first hydraulic pump (150a) and the first accumulator (230). In some embodiments, the first hydraulic pump (150a) supplies the third accumulator (233) with hydraulic pressure. In some embodiments, the third accumulator (233) supplies the first accumulator (230) with hydraulic pressure.

In some embodiments, an electric motor shut-off system (270) is operatively connected to the third accumulator (233). In some embodiments, upon reaching a first, high pressure in the third accumulator (233), the electric motor (110a) is deactivated. In some embodiments, upon reaching a second, low pressure in the third accumulator (233), the electric motor (110a) is activated.

In some embodiments, a fourth accumulator (234) is operatively connected to the second hydraulic pump (160b) and the first accumulator (230). In some embodiments, the second hydraulic pump (160b) supplies the fourth accumulator (234) with hydraulic pressure. In some embodiments, the fourth accumulator (234) supplies the first accumulator (230) with hydraulic pressure.

In some embodiments, the system (100) further comprises a hydrogen fuel cell (180) operatively connected to the electric motor (110a). In some embodiments, the hydrogen fuel cell (180) supplies the electric motor (110a) with electric energy for extended range.

In some embodiments, as outlined in FIG. 2, the second hydraulic pump (160b) supplies the fourth accumulator (234). In some embodiments, upon receiving a high pressure in the fourth accumulator (234), a valve (290) is opened to allow extra hydraulic pressure supply the second hydraulic motor (150b) and drive the electric generator (110b) to charge the battery (120). In some embodiments, the first accumulator (230) is always full of high pressure so the fourth accumulator (234) supplies the first accumulator (230) when the vehicle is in drive mode.

In some embodiments, as outlined in FIG. 3, the present invention comprises a drive mode with a hydrogen fuel cell (280). In some embodiments, the hydrogen fuel cell (280) supplies the electric motor (110a) with electric energy. In some embodiments, the battery (120) supplies the electric motor (110a) with electric energy.

Overview. The fuel engine drives the fuel engine hydraulic pump. The fuel engine hydraulic pump supplies the second accumulator with hydraulic pressure. The second accumulator supplies the first accumulator with hydraulic pressure.

The fuel engine shut-off system turns the fuel engine off any time the second accumulator is full of hydraulic pressure and turns the fuel engine on any time the second accumulator is empty of hydraulic pressure.

The electric motor drives the first hydraulic pump. The first hydraulic pump supplies the third accumulator with hydraulic pressure. The third accumulator supplies the first accumulator with hydraulic pressure.

The electric shut-off system turns off the electric motor any time the third accumulator is full of hydraulic pressure and turns the electric motor on any time the third accumulator is empty of hydraulic pressure.

The fourth accumulator supplies the first accumulator with hydraulic pressure stored by the wheels. The first accumulator supplies the first hydraulic motor with hydraulic pressure and drives the wheels of the vehicle.

The distributor lets the first hydraulic motor drive the vehicle forward or backward or neutral.

The first hydraulic accumulator supplies both hydraulic steering power and hydraulic brake power even if both the fuel engine and the electric motor are off.

In braking mode, the wheel of the vehicle drives the second hydraulic pump. The second hydraulic pump supplies the fourth accumulator with hydraulic pressure. The fourth accumulator supplies the first accumulator with hydraulic pressure. Anytime the fourth accumulator is full of hydraulic pressure the valve opens the flow of extra hydraulic pressure to drive the hydraulic motor and drive the electric generator and charge the battery.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. An electric hydraulic motor system (100) for vehicles, wherein the system (100) comprises:
  (a) an electric motor (110a) and an electric generator (110b), wherein both the electric motor (110a) and the electric generator (110b) are operatively connected to a battery (120) of a vehicle;
  (b) a fuel engine hydraulic pump (140) operatively connected to a standard fuel engine (130) of the vehicle;
  (c) a hydraulic reservoir (170) operatively connected to the fuel engine hydraulic pump (140);
  (d) a first hydraulic pump (150a) operatively connected to each of the electric motor (110a) and the hydraulic reservoir (170);
  (e) a first hydraulic motor (160a) operatively connected to each of the hydraulic reservoir (170) and wheels (210) of the vehicle;
  (f) a second hydraulic motor (150b) operatively connected to each of the electric generator (110b) and the hydraulic reservoir (170);
  (g) a second hydraulic pump (160b) operatively connected to each of the wheels (210) of the vehicle and the hydraulic reservoir (170);
  (h) a first accumulator (230);
  (i) a second accumulator (232);
  (j) a third accumulator (233); and
  (k) a fourth accumulator (234);
  wherein in a drive mode, the electric motor (110a) and standard fuel engine (130) of the vehicle together create hydraulic pressure via the first hydraulic pump (150a) and the fuel engine hydraulic pump (140), the first hydraulic pump (150a) and the fuel engine hydraulic pump (140) supply the first hydraulic motor (160a) with hydraulic pressure to drive the wheels (210) of the vehicle,
  wherein in a braking mode, the wheels (210) supply the hydraulic pressure to the fourth accumulator (234), wherein the second hydraulic motor (150b) is supplied with hydraulic pressure via a valve (290) to drive the electric generator (110b) and charge the battery (120) of the vehicle,
  wherein a distributor (220) is operatively connected to the first hydraulic motor (160a) and the first accumulator (230), wherein the distributor (220) is a switching component having a first mode and a second mode, wherein the first mode is engaged to supply the first hydraulic motor (160a) with hydraulic pressure to drive the wheels (210) of the vehicle in a first direction, wherein the second mode is engaged to supply the second hydraulic motor (150b) with hydraulic pressure to drive the wheels (210) of the vehicle in a second direction.

2. An electric hydraulic motor system (100) for vehicles, wherein the system (100) comprises:
  (a) an electric motor (110a) and an electric generator (110b), wherein both the electric motor (110a) and the electric generator (110b) are operatively connected to a battery (120) of a vehicle;
  (b) a fuel engine hydraulic pump (140) operatively connected to a standard fuel engine (130) of the vehicle;
  (c) a hydraulic reservoir (170) operatively connected to the fuel engine hydraulic pump (140);
  (d) a first hydraulic pump (150a) operatively connected to each of the electric motor (110a) and the hydraulic reservoir (170);
  (e) a first hydraulic motor (160a) operatively connected to each of the hydraulic reservoir (170) and wheels (210) of the vehicle;
  (f) a second hydraulic motor (150b) operatively connected to each of the electric generator (110b) and the hydraulic reservoir (170);
  (g) a second hydraulic pump (160b) operatively connected to each of the wheels (210) of the vehicle and the hydraulic reservoir (170);
  (h) a first accumulator (230);
  (i) a second accumulator (232);
  (j) a third accumulator (233); and
  (k) a fourth accumulator (234);
  wherein in a drive mode, the electric motor (110a) and standard fuel engine (130) of the vehicle together create hydraulic pressure via the first hydraulic pump (150a) and the fuel engine hydraulic pump (140), the first hydraulic pump (150a) and the fuel engine hydraulic pump (140) supply the first hydraulic motor (160a) with hydraulic pressure to drive the wheels (210) of the vehicle,
  wherein in a braking mode, the wheels (210) supply the hydraulic pressure to the fourth accumulator (234), wherein the second hydraulic motor (150b) is supplied with hydraulic pressure via a valve (290) to drive the electric generator (110b) and charge the battery (120) of the vehicle,
  wherein the first accumulator (230) is operatively connected to a steering system (240) of the vehicle, wherein the first accumulator (230) supplies hydraulic pressure to the steering system (240) of the vehicle to provide operating power to steer the vehicle.

3. The system (100) of claim 2, wherein the second accumulator (232) is operatively connected to the fuel engine hydraulic pump (140) and the first accumulator (230), wherein the fuel engine hydraulic pump (140) supplies the second accumulator (232) with hydraulic pressure, wherein the second accumulator (232) supplies the first accumulator (230) with hydraulic pressure.

4. The system (100) of claim 3, wherein a fuel engine shut-off system (260) is operatively connected to the second accumulator (232), wherein upon reaching a first, high pressure in the second accumulator (232), the fuel engine (130) is deactivated, wherein upon reaching a second, low pressure in the second accumulator (232), the fuel engine (130) is activated.

5. The system (100) of claim 2, wherein the third accumulator (233) is operatively connected to the first hydraulic pump (150a) and the first accumulator (230), wherein the first hydraulic pump (150a) supplies the third accumulator (233) with hydraulic pressure, wherein the third accumulator (233) supplies the first accumulator (230) with hydraulic pressure.

6. The system (100) of claim 5, wherein an electric motor shut-off system (270) is operatively connected to the third accumulator (233), wherein upon reaching a first, high pressure in the third accumulator (233), the electric motor (110a) is deactivated, wherein upon reaching a second, low pressure in the third accumulator (233), the electric motor (110a) is activated.

7. The system (100) of claim 2, wherein the fourth accumulator (234) is operatively connected to the second hydraulic pump (160b) and the first accumulator (230), wherein the second hydraulic pump (160b) supplies the fourth accumulator (234) with hydraulic pressure, wherein the fourth accumulator (234) supplies the first accumulator (230) with hydraulic pressure.

8. An electric hydraulic motor system (100) for vehicles, wherein the system (100) comprises:
   (a) an electric motor (110a) and an electric generator (110b), wherein both the electric motor (110a) and the electric generator (110b) are operatively connected to a battery (120) of a vehicle;
   (b) a fuel engine hydraulic pump (140) operatively connected to a standard fuel engine (130) of the vehicle;
   (c) a hydraulic reservoir (170) operatively connected to the fuel engine hydraulic pump (140);
   (d) a first hydraulic pump (150a) operatively connected to each of the electric motor (110a) and the hydraulic reservoir (170);
   (e) a first hydraulic motor (160a) operatively connected to each of the hydraulic reservoir (170) and wheels (210) of the vehicle;
   (f) a second hydraulic motor (150b) operatively connected to each of the electric generator (110b) and the hydraulic reservoir (170);
   (g) a second hydraulic pump (160b) operatively connected to each of the wheels (210) of the vehicle and the hydraulic reservoir (170);
   (h) a first accumulator (230);
   (i) a second accumulator (232);
   (j) a third accumulator (233); and
   (k) a fourth accumulator (234);
   wherein in a drive mode, the electric motor (110a) and standard fuel engine (130) of the vehicle together create hydraulic pressure via the first hydraulic pump (150a) and the fuel engine hydraulic pump (140), the first hydraulic pump (150a) and the fuel engine hydraulic pump (140) supply the first hydraulic motor (160a) with hydraulic pressure to drive the wheels (210) of the vehicle,
   wherein in a braking mode, the wheels (210) supply the hydraulic pressure to the fourth accumulator (234), wherein the second hydraulic motor (150b) is supplied with hydraulic pressure via a valve (290) to drive the electric generator (110b) and charge the battery (120) of the vehicle,
   wherein the first accumulator (230) is operatively connected to a braking system (250) of the vehicle, wherein the first accumulator (230) supplies hydraulic pressure to the braking system (250) of the vehicle to provide operating power to brake the vehicle.

9. The system (100) of claim 8, wherein the second accumulator (232) is operatively connected to the fuel engine hydraulic pump (140) and the first accumulator (230), wherein the fuel engine hydraulic pump (140) supplies the second accumulator (232) with hydraulic pressure, wherein the second accumulator (232) supplies the first accumulator (230) with hydraulic pressure.

10. The system (100) of claim 9, wherein a fuel engine shut-off system (260) is operatively connected to the second accumulator (232), wherein upon reaching a first, high pressure in the second accumulator (232), the fuel engine (130) is deactivated, wherein upon reaching a second, low pressure in the second accumulator (232), the fuel engine (130) is activated.

11. The system (100) of claim 8, wherein the third accumulator (233) is operatively connected to the first hydraulic pump (150a) and the first accumulator (230), wherein the first hydraulic pump (150a) supplies the third accumulator (233) with hydraulic pressure, wherein the third accumulator (233) supplies the first accumulator (230) with hydraulic pressure.

12. The system (100) of claim 11, wherein an electric motor shut-off system (270) is operatively connected to the third accumulator (233), wherein upon reaching a first, high pressure in the third accumulator (233), the electric motor (110a) is deactivated, wherein upon reaching a second, low pressure in the third accumulator (233), the electric motor (110a) is activated.

13. The system (100) of claim 8, wherein the fourth accumulator (234) is operatively connected to the second hydraulic pump (160b) and the first accumulator (230), wherein the second hydraulic pump (160b) supplies the fourth accumulator (234) with hydraulic pressure, wherein the fourth accumulator (234) supplies the first accumulator (230) with hydraulic pressure.

* * * * *